United States Patent [19]

Uchiyama et al.

[11] 4,060,451
[45] Nov. 29, 1977

[54] POLYAMIDE-IMIDE AND MICA PULP PARTICLES AND PAPER-LIKE SHEETS MADE THEREFROM

[75] Inventors: Shuichi Uchiyama; Satoshi Utsunomiya; Hideo Watase, all of Hino, Japan

[73] Assignee: Teijin Limited, Osaka, Japan

[21] Appl. No.: 703,364

[22] Filed: July 8, 1976

Related U.S. Application Data

[63] Continuation of Ser. No. 492,136, July 26, 1974, abandoned, which is a continuation-in-part of Ser. No. 345,287, March 27, 1973, abandoned.

[30] Foreign Application Priority Data

Mar. 31, 1972 Japan ................................. 47-32407

[51] Int. Cl.² .............................................. D21F 11/00
[52] U.S. Cl. ................................. 162/157 R; 162/138; 162/146; 162/181 C
[58] Field of Search .................... 162/138, 146, 157 R, 162/181 C; 260/30.4 N, 47 CP, 37 N; 174/110 N, 124 R, 137 B; 264/205, 140, 141

[56] References Cited

FOREIGN PATENT DOCUMENTS 2,179,004  4/1973  France ................... 162/146

Primary Examiner—S. Leon Bashore
Assistant Examiner—Peter Chin
Attorney, Agent, or Firm—Sherman & Shalloway

[57] ABSTRACT

Pulp particles consisting essentially of 50 to 90% by weight of mica particles and 50 to 10% by weight of polyamide-imide, said polyamide-imide forming a continuous phase in which said mica particles are dispersed discontinuously.

A paper-like sheet comprising an integrated intimate mixture of 20 to 95% by weight of the pulp particles and 80 to 5% by weight of staple fibers of a thermally stable polymer.

17 Claims, No Drawings

POLYAMIDE-IMIDE AND MICA PULP PARTICLES AND PAPER-LIKE SHEETS MADE THEREFROM

This is a continuation of application Ser. No. 492,136, filed July 26, 1974 now abandoned, which is, in turn, a continuation-in-part of application Ser. No. 345,287, filed Mar. 27, 1973, now abandoned.

This invention relates to pulp particles and a sheet made from a mixture of them with staple fibers by a paper-making process.

Natural pulp particles have previously been best known as pulp particles for use in the production of paper. In recent years, pulp particles obtained from synthetic polymer have attracted attention as materials for electrical insulating paper because of their superior thermal stability and electrical insulation.

For example, U.S. Pat. No. 2,999,788 discloses paper pulp particles composed of synthetic polymers. These paper pulp particles, however, have the defect that when they are processed and used as electrical insulating sheet, its impregnating ability, thermal resistance and flame resistance of the sheet are not sufficient. In rendering electrical machinery such as an electrically driven power generator small-sized and light in weight, an electrical insulating sheet having superior thermal resistance and insulating oil impregnating ability is required. The above paper pulp particles do not meet these requirements fully.

On the other hand, British Patent Specification No. 1,129,097 discloses a high-temperature-resistant sheet-like structure suitable for use in electrical insulation comprising an intertwined mixture of particulate mica and substantially unfused aromatic polyamide fibrids. However, this sheet-like structure has insufficient thermal resistance and impregnating ability as an electrical insulating material for electric machinery and appliances which are to be rendered small-sized and light in weight. Furthermore, this prior art technique suffers from the defect that the paper-making operation meets with extreme difficulty because of the separation of the mica from the fibrids at the time of producing such a sheet-like structure. This sheet-like structure also has the defect that the mica is easily removed by rubbing.

Further U.S. Pat. No. 3,080,272 discloses a sheet-like structure comprising a fused homogeneous waterleaf of synthetic organic polymer fibrids and inorganic flake-like material in which the fabrids form a continuous phase and mica is dispersed therein as the flake-like material. Likewise U.S. Pat. No. 3,523,061 discloses a porous sheet-like structure comprising rod-like staple fibers of heat fusible polymer such as polyethylene terephthalate and mica flakes.

The sheet-like structures disclosed in these prior art references are however a similar type of the sheet-like structure disclosed in the aforementioned British Patent Specification No. 1,129,097, and are, therefore, not free similarly from various defects involved in said prior art technique.

We have now found that pulp particles comprising specific polyamide-imide polymer and mica having a specific range of particle size are free from these defects of the prior methods, and instead have superior sheet-formability, impregnating ability, electric insulation, thermal resistance, flame resistance and resistance to removal. We have also found that a paper-like sheet produced on a paper-making machine from the pulp particles and staple fibers of a thermally stable polymer has excellent properties.

According to the present invention, there are provided pulp particles consisting essentially of 50 to 90% by weight of mica particles having a particle size in a range of 60 – 3000 Tyler mesh and 50 to 10% by weight of a film-forming polyamide-imide at least 70 mol % of which recurring units consist of at least one or more of recurring units of the following formula

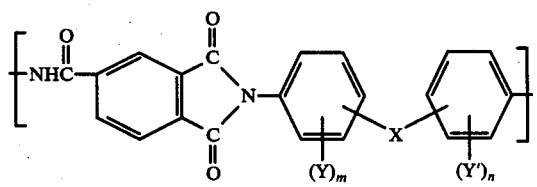

wherein X is at least one member selected from the group consisting of alkylene, alkylidene, cycloalkylene or cycloalkylidene having respectively 1 – 6 carbon atoms, $-O-$, $-S-$, $-SO_2-$, $-N=N-$,

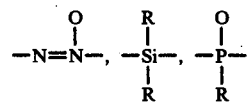

in which R is an organic radical having 1 – 10 carbon atoms; Y and Y' may be same or different and each is at least one member selected from the group consisting of a hydrocarbon group having 1 – 6 carbon atoms, a halogen atom, an alkoxy group having 1 – 3 carbon atoms, an aryloxy group having 6 – 10 carbon atoms, a carbalkoxy group having 2 – 10 carbon atoms and an alkoxycarbonyl group having 1 – 5 carbon atoms; $m$ and $n$ may be same or different and each is a number from 0 to 3; in which said polyamide-imide forms a continuous phase and said mica particles are dispersed discontinuously in said continuous phase.

According to the present invention, there is also provided a sheet comprising a hot-pressed, integrated intimate mixture of 20 to 95% by weight of the pulp particles described above and 80 to 5% by weight of staple fibers of a thermally stable polymer.

Now the present invention will be explained further in detail.

The feature of the pulp particles of the present invention resides in selection of specific polyamide-imide as a polymer component and of mica an inorganic filler.

The mica used in this invention may be those available at low cost and having superior electric insulation, thermal stability and flame resistance, examples of which include muscovite, sericite, or phlogopite, biotite, etc.

The particle size of the mica to be used in the present invention should be in a range of 60 – 3000 Tyler mesh.

In the pulp particles of this invention, at least 70 mol %, preferably 85 mol % or more of polyamide-imide as the polymer component should be composed of recurring units which are expressed by the following formula

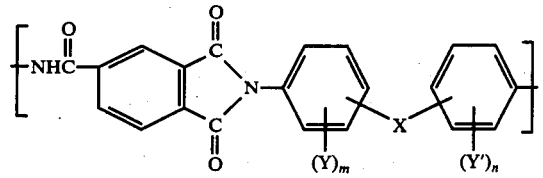

in which X, Y, Y', m and n have the same meanings as defined already.

Of those, especially preferred are —CH$_2$—, —O— and —SO$_2$— as X; a methyl group, a halogen atom and a methoxy group as Y and Y'; and 0 or 1 as m and n.

The polyamide-imide to be used in the present invention may also include not more than 30 mol %, preferably not more than 15 mol % of recurring units which are expressed by the following formula

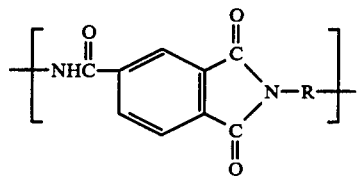

in which R is an alkylene having 2 - 15 carbon atoms,

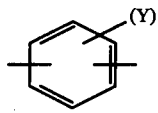

(Y has the same meaning as defined above),

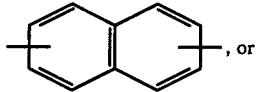, or

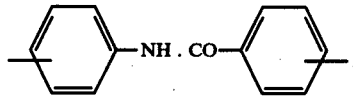.

Not more than 30 mol%, preferably not more than 15 mol% of recurring units of the polyamide-imide that is used in the present invention may contain nitrogen-containing polyheterocyclic compounds such as polyamidebenzimidazole, aromatic polyimide, etc. or aromatic polyamide to be described in later-appearing paragraphs.

The polyamide-imide to be used in the present invention has film-forming ability and has a logarithmic viscosity (measured in a solvent of N-methyl-2-pyrrolidone at a concentration of 0.5 g/100 ml at 30° C.) in a range of 0.35 - 2.0, preferably 0.6 - 0.9. In the pulp particles of this invention, the amount of the mica particles to be used should be 50 to 90% by weight of the total amount of the pulp particles. If the amount is less than 50% by weight, the effect of the mica is not produced, and a paper-like sheet obtained from such pulp particles does not possess good thermal resistance, flame resistance, and impregnating ability. If, on the other hand, the amount exceeds 90% by weight, the mechanical properties of the resultant paper-like sheet, such as strength and elongation, are reduced. Preferably, the amount of the mica is 60 to 80% by weight, especially 60 to 70% by weight.

The pulp particles of the present invention are produced by dissolving the polyamide-imide in a suitable solvent, adding mica particles to the solution, and introducing the resulting solution into a suitable precipitating agent to precipitate it as fine particles. At this time the precipitating agent is stirred at high speed; and the process is operated so that upon the elimination of the solvent from the solution, a shearing or beating action will be generated. The solvent used in this process is suitably a water-soluble solvent which dissolves the polymer component of the pulp particles but is inert to the mica. Examples of such solvents are inorganic solvents such as sulfuric acid, hydrofluoric acid, fuming sulfuric acid, chlorosulfuric acid, fluorosulfuric acid or polyphosphoric acid, and organic solvents such as N-methyl-2-pyrrolidone, N,N-dimethylformamide, N-N-dimethyl acetamide, dimethyl sulfoxide, hexamethyl phosphorylamide, or tetramethyl urea. These inorganic or organic solvents may be used in admixture. The solvent may also contain an inorganic salt such as lithium chloride or calcium chloride in order to increase its polymer solubilizing power.

The concentration of the polymer in the solution varies according to the type and the degree of polymerization of the polymer, but is preferably about 2 to 15% by weight.

The precipitating agent used in the above described method is desirably a liquid or solution which is miscible with the solvent of the polymer solution but is a non-solvent for the polymer. The type of the precipitating agent is selected according to the type of the solvent used. Where the organic solvent is used, the precipitating agent that can be used may be water, glycerine, ethylene glycol, a mixture of water with glycerine or ether, or may also be an aqueous solution containing at least one salt expressed by the formula MX$_n$ wherein M is Li, Na, K, Mg, Ca, Sr, Ba, Sn, Zn, Al or Ni, X is Cl, NO$_3$, Br, CH$_3$COO or SCN, and n is an integer of 1 to 4. Examples of such salts are calcium chloride, lithium chloride, sodium chloride, magnesium chloride, zinc chloride, strontium chloride, aluminum chloride, stannic chloride, nickel chloride, calcium bromide, calcium nitrate, zinc nitrate, aluminum nitrate, sodium acetate, potassium thiocyanate, and calcium thiocyanate. Calcium chloride, lithium chloride, aluminum chloride, calcium thiocyanate and sodium acetate are especially suitable. Of these, an aqueous solution of calcium chloride is especially preferred because of its ease of handling. Of these various precipitating agents, aqueous systems are especially suitable. Where the inorganic solvent is used, that precipitating agent may be water alone or the inorganic solvent diluted with water.

The pulp particles of this invention produced by the method described above have such a structure that a number of fine particles of mica are embedded in the finely dispersed state as a discontinuous phase in a continuous phase of the polymer. Accordingly, the mica particles have very good resistance to removal. Furthermore, as a number of sharp-edged concavities and convexities are present on the surface of the pulp particles, the intertwining of the pulp particles among one another is very good. By subjecting a mixture of these particles with staple fibers to a paper-making process, a paperlike sheet of good quality can be prepared. Furthermore, since the pulp particles of this invention comprises mica which is inexpensive and has superior electrical insulation, thermal resistance and flame resistance, the paper-like sheet obtained from such pulp particles and staple fibers has markedly improved electrical insulation, thermal resistance and flame resistance and is available at low cost.

The formation of a sheet from a mixture of the pulp particles of this invention with staple fibers is preferably carried out by the wet process using a Fourdrinier machine or cylinder paper machine just as in the case of the conventional paper-making using natural pulp.

It is necessary that the amount of the pulp particles be 20 to 95% by weight, preferably 20 to 80% by weight, more preferably 40 to 70% by weight, based on the total amount of the sheet. If the amount of the pulp particles is less than 20% by weight, the properties of the resulting sheet, such as dielectric breakdown voltage, strength or elongation, become poor. On the other hand, if the amount of the pulp particles exceeds 95% by weight, the resulting sheet has poor strength and elongation and impregnating ability with insulating oils.

The staple fibers used in the preparation of the sheet of this invention need to be thermally resistant. Usually, it is desirable that such fibers have a denier of 0.5 to 10 and a length of 1 to 20 mm. Various polymers can be used to form such heat-resistant fibers. Examples of such fibers include:

1. Staple fibers composed of the nitrogen-containing polyheterocyclic compounds.

Examples of the nitrogen-containing polyhetrocyclic compounds are as follows:

a. Aromatic polyamide-imides as cited above for use in producing the pulp particles.

b. Aromatic polyamide-benzimidazoles containing units of the formula

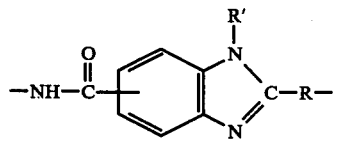

wherein R is the same as defined above, and R' is hydrogen or a monovalent organic group. These polyamide-imidazoles may have an inert substituent such as a methyl group, alkoxy group or halogen atom.

c. Aromatic polyimides containing units of the formula

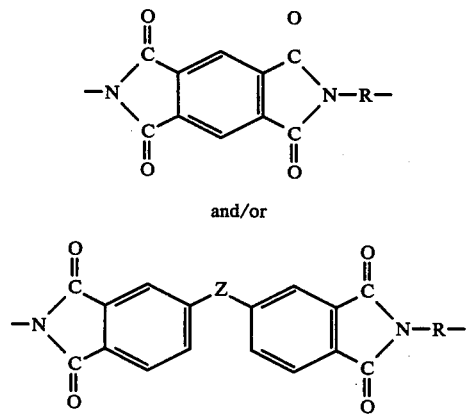

wherein R is the same as defined above and Z represents at least one of divalent groups selected from —SO$_2$—, and —O—.  These polyimides may have an inert substituents such as a methyl group, alkoxy group or halogen atom.

d. Polyazoles; such as polyoxazole, polyoxadiazole, polythiazole, polythiadiazole e. Polybenzazole, such as polybenzimidazole, polybenzthiazole, polybenzoxazole f. Polyhydantoin, polyparabaniacid, polyquinazolinedione, polyquinazolone g. Polyquinoxaline, polyoxadinone 2. Staple fibers composed of aromatic polyamides. Examples of the aromatic polyamides are (a) condensed polyamides formed between dicarboxylic acids having aromatic rings, preferably high active derivatives thereof such as acid halides, and diamines having aromatic rings, such as a homopolymer of one dicarboxylic acid selected from terephthalic acid and isophthalic acid and one diamine selected from m-phenylene diamine, 4,4'-diaminodiphenyl ether, 4,4'-diaminodiphenylmethane, xylylene diamine and N-methyl-p-phenylene diamine, or a copolymer of at least two of said dicarboxylic acids and said diamines or of one dicarboxylic acid or diamine with at least two of the other component. Typical examples are polymethaphenylene isophthalamide, polymetaphenylene terephthalamide, and a copolymer of metaphenylene diamine, isophthalic acid and terephthalic acid; (b) polyamides obtained by polycondensation of aminocarboxylic acids having aromatic rings, preferably by activation prior to polycondensation such as homopolymers of para- or meta-aminobenzoic acid or para-aminomethylbenzoic acid, or copolymers of at least two of such aminocarboxylic acids. A typical example is a polycondensate of paraaminobenzoic acid; and (c) copolyamides obtained by copolymerization of (a) and (b). A typical example is a polyamide composed of metaphenylene diamine, isophthalic acid and paraaminobenzoyl chloride hydrochloride.

3. Staple fibers composed of polyphenylene oxide or polyarylene oxides.

4. Staple fibers composed of aromatic polyesters, examples of which are (a) polyethylene-2,6-naphthalate and polyethylene-2,7-naphthalate; (b) copolyesters containing at least 85 mol% of ethylene-2,6-naphthalate or ethylene-2,7-naphthalate units, those containing an aromatic dicarboxylic acid as an acid component being preferred; (c) mixed polyesters containing (i) polyethylene-2,6-naphthalate and/or polyethylene-2,7-naphthalate, and/or (ii) a copolyester containing at least 85 mol% of ethylene-2,6-naphthalate and/or ethylene-2,7-naphthalate; (d) polyethylene terephthalate; (e) copolyesters containing at least 85 mol% of ethylene terephthalate units, those containing an aromatic dicarboxylic acid as an acid component being preferred; and (f) mixed polyesters containing (i) polyethylene terephthalate and/or (ii) copolyesters containing at least 85 mol% of ethylene terephthalate units.

5. Staple fibers composed of inorganic compounds, such as glass fibers, asbestos fibers, rock wool, slug wool, fused silica fibers, glassy silica fibers, porcelain fibers, kaoline fibers, bauxite fibers, boron fibers, potassium titanate fibers, magnesia fibers, alumina whiskers, and silicon nitride whiskers.

6. Natural fibers such as cellulose fibers, regenerated cellulose fibers, or cellulose acetate fibers. One or more kinds of the staple fibers may be used. Since the difference in specific gravity between the pulp particles and the staple fibers is small, they can be dispersed uniformly within the dispersion in the sheet-forming process using the pulp particles of this invention. This makes the sheet-forming operation easy, and gives a very uniform sheet.

The resulting sheet is dried, and hot pressed using such a device as a hot press or hot roll to give a paper-like sheet of good quality. The temperature for hot pressing differs somewhat according to the crystallinity, the degree of polymerization, etc. of the pulp particles and the staple fibers, but is suitably between 140° and 320° C. The pressure also differs according to the crystallinity, the degree of polymerization, etc. of the pulp particles and the staple fibers, but is preferably not more than 200 Kg/cm$^2$.

In the paper-like sheet of this invention, fine pores are embraced in the fine texture of the paper-like sheet by means of a number of sharp-edged concavities and convexities present on the surfaces of the pulp particles. Accordingly, this sheet has a better impregnating ability with insulation oils than a paper-like sheet obtained from pulp particles composed only of synthetic polymers.

Utilizing superior thermal resistance and electrical insulation, the sheet obtained from the pulp particles of this invention can be used effectively as an electrical insulating sheet, and also finds applications as building and structural materials utilizing its good flame resistance and mechanical properties.

The methods of measuring the various properties are shown below.

Logarithmic Viscosity ($\eta$ inh)

Measured in N-methyl-2-pyrrolidone in a concentration of 0.5 g/100 ml. at 30° C.

Dielectric Strength

Measured in accordance with JIS C 2111 using an alternate current voltage.

Flame Resistance

The sample with a width of 12.5 mm is contacted with 2.5 cm flame of a Bunsen burner for 2 seconds. Then, the flame is brought away from it. When the sample is burned with flame, the flame resistance is evaluated as poor, and when it is not at all burnt, the flame resistance is evaluated as good.

Impregnating Ability (Permeability)

The sample cut in a circular shape with a diameter of 10 mm is made afloat on the surface of an insulating oil (JIS No. 1), and the time required until the insulating oil permeates into all over the surface of the sample is measured.

Surface Strength of the Sheet

Measured in accordance with the method of JIS P 8129.

The following Example will illustrate the present invention.

EXAMPLE 1

Production of Pulp Particles

Trimellitic anhydride and 4,4'-diaminodiphenylmethane were subjected to a condensation reaction in a mol ratio of 2:1 to prepare a bis-imide, after which trimellitic anhydride and 4,4'-diphenylmethane diisocyanate were further added in a mol ratio of 2:3 to one mol of the 4,4'-diamino diphenylmethane to prepare a polyamide-imide. The resulting polyamide-imide has a logarithmic viscosity of 0.5 in N-methyl-2-pyrrolidone.

Ten grams of the resulting polyamide-imide was dissolved in 90 g of N-methyl-2-pyrrolidone, and thereafter the resulting solution was mixed respectively with 2.5 g, 10 g, 23.3 g and 190 g of fine particles of sericite having a particle size within a range of 325 – 3000 Tyler mesh.

Each of the resultant mixtures was fed into 1 liter of water placed in a homomixer agitated at high speed to form precipitates. The resulting pulp particles are designated Nos. 1, 2, 3 and 4. Pulp particles Nos. 2 and 3 are within the scope of the present invention, whereas pulp particles Nos. 1 and 4 are outside the scope of the present invention.

For comparison, 10 g of the same polyamide-imide as above was dissolved in 90 g of N-methyl-2-pyrrolidone. Without addition of mica, the solution was fed into one liter of water placed in a homomixer stirred at high speed to induce precipitation, and to produce pulp particles consisting only of the polyamide-imide. The resulting pulp particles were designated as No. 5.

In the production of the pulp particles described above, the solution containing the precipitate was centrifuged. The pulp particles Nos. 3 and 4 consisting predominantly of the sericite were found easier to separate than the pulp particle No. 5 which consisted only of the polyamide-imide, and could be separated in 6 and 2 minutes respectively at 5,200 rpm. In contrast, the pulp particle No. 5 did not separate fully even after 60 minutes.

Production of Sheet

Each of the pulp particles Nos. 1 to 5 were fully washed, and dispersed in water to form an aqueous dispersion containing 1.4 g of the pulp particles. Separately, the same polyamide-imide as used to produce the pulp particles was dissolved in N-methyl-2-pyrrolidone to form a spinning solution. The spinning solution was wet spun into a coagulating bath at 60° C. comprising an 42 weight % aqueous solution of calcium chloride, drawn to 2.4 times in dry heat at 320° C., and cut to a length of 5 mm to form staple fibers. Each of the above aqueous dispersions of the pulp particles was well mixed with an aqueous dispersion containing 0.6 g of the staple fibers, and the mixture was poured onto a stainless steel wire screen and subjected to a paper-making process to form a sheet. The resulting sheets were designated Nos. 1 to 5. Since the pulp particles and the staple fibers were very uniformly dispersed in the dispersions, the sheet-forming operation was easy. The sheets were dried at 100° C., and hot pressed at 270° C. and 200 Kg/cm$^2$ to form paper-like sheets each having a thickness of about 100 microns.

Various tests were performed on these paper-like sheets, and the results obtained are shown in Table 1.

Table 1

| Run Nos. | Amount of sericite in pulp particles (% wt.) | Amount of pulp particles in the sheet (% wt.) | Weight ratio in the sheet Polymer | Weight ratio in the sheet Sericite | Weight ratio in the sheet Fibers | Sheet formability | Paper Tensile strength (Kg/mm²) | Paper Tensile elongation (%) | Paper Dielectric strength (KV/mm) | Paper Flame resistance | Paper Impregnating ability (min.) | Paper Coloration after heating |
| --- | --- | --- | --- | --- | --- | --- | --- | --- | --- | --- | --- | --- |
| 1 | 20 | 70 | 56 | 14 | 30 | Good | 3.1 | 3.5 | 13 | Poor | 30 | Heavy |
| 2 | 50 | 70 | 35 | 35 | 30 | Good | 3.0 | 3.1 | 12 | Good | 20 | Slight |
| 3 | 70 | 70 | 21 | 49 | 30 | Good | 3.2 | 3.4 | 10 | Good | 20 | Slight |
| 4 | 95 | 70 | 3.5 | 66.5 | 30 | Good | 1.5 | 2.0 | 8 | Good | 10 | Slight |
| 5 | 0 | 70 | 70 | 0 | 30 | Good | 2.7 | 2.0 | 15 | Poor | 40 | Heavy |
| 6 | 0 | 35 | 35 | 35 | 30 | Poor | 2.0 | 2.2 | 12 | Good | 30 | Slight |

Nos. 2 and 3 were the sheets in accordance with the present invention, and exhibited good strength, elongation and dielectric strength. They also showed good flame resistance. In an impregnation test, an insulating oil permeated into all over the surfaces of these sheets in 20 minutes, and these sheets showed good impregnating ability. Furthermore, when these sheets were allowed to stand for 5 hours at 290° C., their coloration was very slight. These sheets Nos. 2 and 3 had a surface strength of 18A, showing very good resistance to the removal of mica.

In sheet No. 1, the amount of the gericite in the pulp particles was small. It exhibited good strength, elongation and dielectric strength, but poor flame resistance and impregnating ability. When left to stand for 5 hours at 290° C., it was heavily colored owing to the heat.

Sheet No. 4 has poor strength, elongation and dielectric strength because the amount of the polymer component in the pulp particles was too small.

Sheet No. 5 which did not contain the sericite showed poor strength, elongation, flame resistance, impregnating ability and coloration (after heating at 290° C. for 5 hours) as compared with sheets Nos. 2 and 3.

For comparison, sheet No. 6 was prepared, and tested. Sheet No. 6 was produced by preparing an aqueous dispersion containing the pulp particles composed only of the polymer component (used in the preparation of sheet No. 5), sericite and polyamide-imide staple fibers in a weight ratio of 35:35:30, mixing the three components thoroughly in the aqueous dispersion, and subjecting it to a paper-making process using a 100 mesh stainless steel wire screen, followed by drying and hot pressing to form a paper-like sheet having a thickness of about 100 microns. In the preparation of sheet No. 6, the sericite precipitated rapidly because of its high specific gravity, and one surface of the sheet consisted almost entirely of the sericite. When the sheet was removed from the paper-making wire screen, part of the sericite remained spottily on the wire screen. This undesirably resulted in poor sheet-formability. The resulting paper-like sheet No. 6 had good flame resistance, and dielectric strength, but poor strength, elongation and impregnating ability. This sheet had a surface strength of less than 2A, exhibiting a far poorer resistance to the removal of mica than the sheets Nos. 2 and 3 of the present invention.

EXAMPLE 2

A paper-like sheet (designated sheet No. 7) was produced in the same way as in Example 1 except that the pulp particles of No. 2 in Example 1 (the weight ratio of the polymer to the mica 1:1) were used, and the weight ratio of the pulp particles to the polyamide-imide staple fibers was changed to 1:9. The paper-like sheet obtained after hot pressing was tested, and the results are shown in Table 2. (Sheet No. 7 is outside the scope of the present invention.)

Table 2

| Run No. | Amount of sericite in pulp particles (% wt.) | Amount of pulp particles in the sheet (% wt.) | Weight ratio in the sheet Polymer | Weight ratio in the sheet Sericite | Weight ratio in the sheet Fibers | Paper Tensile strength (kg/mm²) | Paper Tensile elongation (%) | Paper Dielectric strength (KV/mm) | Paper Flame resistance | Paper Impregnating ability (min.) | Paper Coloration after heating |
| --- | --- | --- | --- | --- | --- | --- | --- | --- | --- | --- | --- |
| 7 | 50 | 10 | 5 | 5 | 90 | 1.0 | 2.0 | 5 | Poor | 15 | Heavy |

The material for sheet No. 7 had good sheet-formability, but the resulting sheet had poor dielectric strength, strength, elongation and flame resistance because of its small content of the pulp particles.

EXAMPLE 3

Ten grams of the same polyamide-imide as used in Example 1 was dissolved in 90 g of N-methyl-2-pyrrolidone. The resulting solution was mixed with 15 g of sericite having a particle size of 325 – 3000 Tyler mesh. With other conditions being the same as in Example 1, pulp particles were produced. A mixture of the pulp particles and the same polyamideimide staple fibers having a length of 5 mm as used in Example 1 was formed into a sheet, which was then hot pressed to produce a paper-like sheet. The amount of the pulp particles in the sheet was changed to 85, 90 and 98% by weight, and three paper-like sheets designated Nos. 8, 9 and 10 were produced. These sheets were tested in the same way, and the results are shown in Table 3. Sheets Nos. 8 and 9 are within the scope of the present invention, and sheet No. 10 is outside the scope of the present invention.

Table 3

| Run Nos. | Amount of sericite in pulp particles (% wt.) | Amount of pulp particles in the sheet (% wt.) | Weight ratio in the sheet Polymer | Weight ratio in the sheet Sericite | Weight ratio in the sheet Fibers | Sheet formability | Paper Tensile strength (Kg/mm²) | Paper Tensile elongation (%) | Paper Dielectric strength (KV/mm) | Paper Flame resistance | Paper Impregnating ability (min.) | Paper Coloration after heating |
| --- | --- | --- | --- | --- | --- | --- | --- | --- | --- | --- | --- | --- |
| 8 | 60 | 85 | 34 | 51 | 15 | Good | 2.2 | 3 | 27 | Good | 20 | Slight |
| 9 | 60 | 90 | 36 | 54 | 10 | Good | 2.0 | 3 | 32 | Good | 25 | Slight |

Table 3-continued

| Run Nos. | Amount of sericite in pulp particles (% wt.) | Amount of pulp particles in the sheet (% wt.) | Weight ratio in the sheet Polymer | Weight ratio in the sheet Sericite | Weight ratio in the sheet Fibers | Sheet form-ability | Paper Tensile strength (Kg/mm$^2$) | Paper Tensile elongation (%) | Paper Dielectric strength (KV/mm) | Paper Flame resistance | Paper Impregnating ability (min.) | Paper Coloration after heating |
|---|---|---|---|---|---|---|---|---|---|---|---|---|
| 10 | 60 | 98 | 39.2 | 58.8 | 2 | Good | 1.1 | 1 | 45 | Good | 40 | Slight |

Sheets Nos. 8 and 9 had good dielectric strength, flame resistance and impregnating ability, and their coloration after heating for 5 hours at 290° C. was slight. These sheets had a surface strength of 18A and the small fragments of the sericite did not separate, showing good resistance to the removal of mica. Sheet No. 10 (comparison) had good dielectric strength and flame resistance and slight coloration after heating for 5 hours at 290° C., but because of its high content of the pulp particles, had poor strength, elongation and impregnating ability.

EXAMPLE 4

This Example shows that the use of mica as an inorganic filler to be included in pulp particles is a very important requirement, and if asbestos is used instead of the mica, the operability is remarkably reduced, and the resulting sheet has poor properties.

Production of Pulp Particles

Trimellitic anhydride and 4,4'-diaminodiphenylmethane were subjected to a condensation reaction in a mol ratio of 2:1 to prepare a bis-imide, after which trimellitic anhydride and 4,4'-diphenylmethane diisocyanate were further added in a mol ratio of 2:3 to one mol of the 4,4'-diamino diphenylmethane to prepare a polyamide-imide. The resulting polyamide-imide has a logarithmic viscosity of 0.8 in N-methyl-2-pyrrolidone. Five parts of the resulting polyamide-imide was dissolved in 95 parts of N-methyl-2-pyrrolidone to form a solution. The solution was mixed with each of mica and asbestos as a filler having a particle size of 100 – 1000 Tyler mesh in the ratios indicated in Table 4. Each of the mixtures obtained was put into a 42% wt. aqueous solution of calcium chloride placed in a homomixer agitated at high speed, to form pulp particles. The mixture containing the asbestos had very poor flowability as compared with the mixture containing the mica particles. Because of this the operability of producing pulp particles was reduced greatly. The results are shown in Table 4.

Table 4

| Composition of the mixture (parts) | Amount of the filler in the pulp particles (wt. %) | Operability Mica | Operability Asbestos |
|---|---|---|---|
| Polymer 5 Filler 2.1 Solvent 95 | 30 | Good | The mixture had poor flowability, leading to difficult operation |
| Polymer 5 Filler 3.8 Solvent 95 | 45 | Good | The mixture had very poor flowability, leading to very difficult operation |
| Polymer 5 Filler 7.5 Solvent 95 | 60 | Good | The mixture scarcely had flowability, leading to failure of operation |

The pulp particles were thoroughly washed, and dispersed in water. Furthermore, in the same way as in Example 1, the same polyamide-imide as used in the preparation of the pulp particles in the present Example was wet spun, drawn, and cut to a length of 4 mm to form staple fibers which were then dispersed in water to form an aqueous dispersion. This dispersion was mixed with the pulp particle aqueous dispersion, and subjected to a sheet-forming process in the same way as in Example 1. The resulting sheet was dried, and pressed at 230° C. and 200 Kg/cm$^2$ to form a paper-like sheet. In the preparation of the sheet, the weight ratio of the pulp particles to the staple fibers was adjusted to 7:3. The resulting paper-like sheets were tested, and the results are shown in Table 5 below.

Table 5

| Amount of filler in pulp particles (wt. %) | Test items | Filler Mica | Filler Asbestos |
|---|---|---|---|
| 30 | Tensile strength (Kg/mm$^2$) | 4.4 | 4.7 |
|  | Tensile elongation (%) | 9.4 | 6.6 |
|  | Dielectric strength (KV/mm) | 43 | 30 |
| 43 | Tensile strength (Kg/mm$^2$) | 3.5 | 3.0 |
|  | Tensile elongation (%) | 7.9 | 4.8 |
|  | Dielectric strength (KV/mm) | 44 | 14 |
| 60 | Tensile strength (Kg/mm$^2$) | 2.2 | * |
|  | Tensile elongation (%) | 5.0 |  |
|  | Dielectric strength (KV/mm) | 27 |  |

*Sheet formation was not performed because it was impossible to produce pulp particles.

The results of Table 5 clearly show that when asbestos is used as the filler, not only is the production of pulp particles difficult, but also sheets produced by using these pulp particles had poor physical properties such as tensile elongation and dielectric strength.

EXAMPLE 5

This Example intends to exemplify that particle size of the mica to be used as a filler plays an important role in the pulp particles of the present invention.

Ten grams of the polyamide-imide used in Example 1 was dissolved in 90 g of N-methyl-2-pyrrolidone, and the resulting solution was mixed with 15 g each of the following muscovites having different particle sizes;
  muscovite (A): passing through 3000 Tyler mesh
  muscovite (B): passing through 60 Tyler mesh but not through 3000 Tyler mesh
  muscovite (C): not passing through 60 Tyler mesh Each of the resulting mixtures was fed into a 42% by weight aqueous solution of calcium chloride placed in a homomixer agitated at high speed to form pulp particles by precipitation. In this case, the mixed solutions using the muscovites (A) and (B) had excellent fluidity, but the mixed solution using the muscovite (C) had an inferior fluidity.

Using three types of pulp particles so prepared and staple fibers of the polyamide-imide used in Example 1, paper-like sheets of a thickness of about 100 microns were prepared in the same way as in Example 1. Impregnating ability and dielectric strength measured on these paper-like sheets are shown in Table 6.

Table 7-continued

| Run No. | Type of polymer | Amount of pulp particles in the sheet (wt. %) | Amount of staple fibers in the sheet (wt. %) | Tensile strength (Kg/cm²) | Tensile elongation (%) | Impregnating ability (min.) | Dielectric strength (KV/mm) |
| --- | --- | --- | --- | --- | --- | --- | --- |
| 29 | imide " | 90 | 10 | 1.9 | 3.0 | 20 | 54 |

The abovementioned four types of the paper-like sheets were left standing for one hour at 250° C. and thereafter subjected to various tests. The results are shown in Table 8.

Table 8

| Run No. | Tensile strength (Kg/mm²) | Tensile elongation (%) | Dielectric strength (KV/mm) | Bending Time* (times) | Coloration after heating |
| --- | --- | --- | --- | --- | --- |
| 26 | 0.4 | 1.5 | 6 | 3 | heavy |
| 27 | 0.1 | 2.4 | 3 | 3 | heavy |
| 28 | 2.0 | 5.0 | 19 | >100 | slight |
| 29 | 2.4 | 2.4 | 50 | >100 | slight |

*Bending time: bending times required till the sample was cut off by bending it to 180°.

From Table 8, it can be seen clearly that the paper-like sheets prepared from the pulp particles of the present invention have extremely superior dielectric strength and thermal resistance in comparison with the paper-like sheets prepared from the pulp particles which are prepared from caprolactamhexamethyleneadipamide copolyamide and muscovite.

EXAMPLE 8

Using an aqueous dispersion containing 1.4 g of the pulp particles of the present invention used in Example 7 comprising polyamide-imide and muscovite, three types of sheets were produced in a paper-making process from three type of aqueous dispersions which contain the following staple fibers prepared by ordinary methods;
i. an aqueous dispersion containing 0.6 g of polyethylene terephthalate staple fibers (2 denier, 5 mm length);
ii. an aqueous dispersion containing 0.6 g of polyethylene-2,6-naphthalate staple fibers (2 denier, 5 mm length); and
iii. an aqueous dispersion containing 0.6 g of polymetaphenylene isophthalamide staple fibers (2 denier, 5 mm length).

The sheets so produced were dried and then not pressed at 230° C. and 200 kg/cm² to form paper-like sheets. The resulting paper-like sheets were tested, and the results are shown in Table 9 below.

Table 9

| Run No. | Staple fiber used | Tensile strength (Kg/mm²) | Tensile elongation (%) | Impregnating ability (min.) | Dielectric strength (IV/mm) |
| --- | --- | --- | --- | --- | --- |
| 30 | polyethylene terephthalate | 2.5 | 3.0 | 4 | 20 |
| 31 | polyethylene-2,6-naphthalate | 3.1 | 4.3 | 2 | 20 |
| 32 | polymetaphenylene isophthalamide | 2.9 | 4.3 | 20 | 20 |

These paper-like sheets were left standing for 1 week at 250° C., and thereafter subjected to various tests. The results of the tests are shown in Table 10.

Table 10

| Run No. | Tensile strength (Kg/mm²) | Tensile elongation (%) | Dielectric strength (KV/mm) |
| --- | --- | --- | --- |
| 30 | 1.0 | 1.0 | 18 |
| 31 | 2.8 | 3.0 | 18 |
| 32 | 2.5 | 3.0 | 18 |

EXAMPLE 9

Using an aqueous dispersion containing 1.4 g of the pulp particles of the present invention used in Example 7 comprising polyamide-imide and muscovite, a sheet was prepared in a paper-making process from an aqueous dispersion containing 0.6 g of an ordinary glass fiber (diameter 5 micron, 5 mm length). The sheet so produced was dried and then hot pressed at 230° C. and 200 kg/cm² to form a paper-like sheet. The resulting paper-like sheet was tested, and the results are shown in Table 11.

Table 11

| Run No. | Tensile strength (Kg/mm²) | Tensile elongation (%) | Impregnating ability (min.) | Dielectric strength (KV/mm) |
| --- | --- | --- | --- | --- |
| 33 | 3.0 | 3.0 | 2 | 20 |

This paper-like sheet was left standing for 1 week at 250° C. and subjected to various tests are shown in Table 12.

Table 12

| Run No. | Tensile strength (Kg/mm²) | Tensile elongation (%) | Dielectric strength (KV/mm) |
| --- | --- | --- | --- |
| 30 | 3.0 | 2.0 | 20 |

What is claimed is:
1. Pulp particles consisting essentially of 50 to 90% by weight of mica particles having a particle size in a range of 60 – 3000 Tyler mesh and 50 to 10% by weight of a film-forming polyamide-imide at least 70 mol % of which recurring units consist of at least one or more of recurring units of the following formula

Table 6

| Run No. | Type of muscovite | Amount of pulp particles in the sheet (% wt) | Amount of staple fibers in the sheet (%. wt) | Impregnating ability (min.) | Dielectric strength (KV/mm) |
| --- | --- | --- | --- | --- | --- |
| 11 | A | 50 | 50 | 35 | 13 |
| 12 | B | 50 | 50 | 10 | 15 |
| 13 | C | 50 | 50 | 5 | 10 |
| 14 | A | 70 | 30 | 35 | 19 |
| 15 | B | 70 | 30 | 15 | 22 |
| 16 | C | 70 | 30 | 3 | 15 |
| 17 | A | 90 | 10 | 40 | 29 |
| 18 | B | 90 | 10 | 17 | 40 |
| 19 | C | 90 | 10 | 10 | 20 |
| 20 | A | 98 | 2 | 1300 | 35 |
| 21 | B | 98 | 2 | 60 | 50 |
| 22 | C | 98 | 2 | 40 | 30 |

The resulting paper-like sheet using the muscovite (C) had a coase, uneven surface and poor dielectric strength, while the paper-like sheet using the muscovite (A) had an inferior impregnating ability.

EXAMPLE 6

This Example intends to exemplify that the use of the polyamide-imide as the polymer component plays an important role in the preparation of the pulp particles of the present invention.

Run No. 23: The paper-like sheet (designated sheet No. 3 in Example 1) was left standing for 24 hours in an atmosphere kept at a temperature of 25° C. and relative humidity of 60%, and thereafter its moisture absorption was measured. The result was about 1.0%. The value of dielectric strength at a relative humidity of 60% was 11 (KV/mm).

Run No. 24: Pulp particles were prepared in the same way as in No. 3 of Example 1 except that polymetaphenylene isophthalamide was used instead of the polyamide-imide.

Separately, polymetaphenylene isophthalamide was wet spun, drawn to 2.5 times in a boiling bath, drawn further to 1.4 times on a heat panel at 300° C. and then cut into a length of 5 mm of form staple fibers.

Using the abovementioned pulp particles and the staple fibers, a paper-like sheet was prepared in the same way as in Example 1, and the resulting paper-like sheet was subjected to measurement of moisture absorption and dielectric strength in the same way as Run No. 23 mentioned above. As the results, the moisture absorption was about 2.6%, and the dielectric strength was 7 (KV/mm).

Run No. 25: Pulp particles were prepared in the same way as in No. 3 of Example 1 except that a copolyamide consisting of 80% by weight of caprolactam unit and 20% by weight of adipamide unit was used instead of the polyamide-imide, and also a calcium chloride-methanol solution was used instead of N-methyl-2-pyrrolidone as the solvent. Using the resulting pulp particles and staple fibers (2 denier, 5 mm length) of the above-mentioned copolymer, a paper-like sheet was prepared in the same way as in Example 1, and the resulting paper-like sheet was subjected to measurement of moisture absorption and dielectric strength in the same way as Run No. 23 mentioned above. As the result, the moisture absorption was about 2.0%, and the dielectric strength was 3 (KV/mm).

From the results of the abovementioned Experiments Run Nos. 23-25, it can be seen that pulp particles prepared from polyamide-imide provide a paper-like sheet which has a smaller moisture absorption ratio and superior dielectric strength when compared to pulp particles prepared from polyamide.

EXAMPLE 7

Five grams of a copolyamide consisting of 80% by weight of caprolactam unit and 20% by weight of adipamide unit was dissolved in a solvent consisting of 6 g of calcium chloride and 89 g of methanol, and the resulting solution was added by 7.5 g of miscovite having a particle size in a range of 60 – 1000 Tyler mesh and mixed uniformly, after which the solution was fed into a 42% by weight calcium chloride aqueous solution placed in a homomixer stirred at a high speed to prepared pulp particles.

Separately, staple fibers (2 denier, 5 mm length) were prepared from the abovementioned copolymer polyamide. Using the staple fibers thus prepared and the pulp particles prepared as above in the proportion of 30:70 (Run No. 26) and also 10:90 (Run No. 27), sheet were prepared on a stainless steel wire screen in a paper-making process in the same way as in Example 1. The sheets were dried at 100° C., and hot pressed at 200° C. and 200 Kg/cm² to form paper-like sheets.

Separately pulp particles of this invention were prepared in the same way as in the above experiment except that the solution of the copolyamide in the calcium chloride-methanol solvent was replaced by a solution which was obtained by dissolving 5 g of the polyamide used in Example 1 in 95 g of N-methyl-2-pyrrolidone. Using the pulp particles so obtained and staple fibers (2 denier, 5 mm length) of the polyamide-imide in the proportion of 70:30 (Run No. 28) and also of 90:10 (Run No. 29), sheets were prepared in the same way as above, followed by heat-drying at 100° C. and hot-pressing at 200° C. and 200 Kg/cm².

Various tests were performed on these four types of paper-like sheets, and the results obtained are shown in Table 7.

Table 7

| Run No. | Type of polymer | Amount of pulp particles in the sheet (wt. %) | Amount of staple fibers in the sheet (wt. %) | Tensile strength (Kg/cm²) | Tensile elongation (%) | Impregnating ability (min.) | Dielectric strength (KV/mm) |
| --- | --- | --- | --- | --- | --- | --- | --- |
| 26 | copolymer polyamide | 70 | 30 | 1.5 | 13.3 | 18 | 5 |
| 27 | " | 90 | 10 | 1.5 | 3.2 | 45 | 7 |
| 28 | polyamide- | 70 | 30 | 3.0 | 7.0 | 10 | 20 |

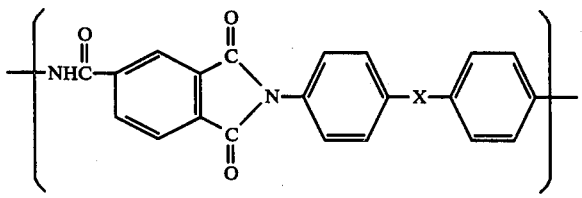

wherein X is —O— or —CH$_2$— in which said polyamide-imide forms a continuous phase and said mica particles are dispersed discontinuously in said continuous phase.

2. The particles according to claim 1 wherein not less than 85 mol % of recurring units of said polyamide-imide comprise the recurring units expressed by said formula.

3. The pulp particles according to claim 1 which has a logarithmic viscosity from 0.35 to 2.0 measured in N-methyl-2-pyrrolidone.

4. The pulp particles of claim 1 wherein the content of said mica particles is 60 to 80% by weight.

5. The pulp particles of claim 1 wherein the content of said mica particles is 60 to 70% by weight.

6. A paper-like sheet comprising an integrated intimate mixture of 20 to 95% by weight of the pulp particles of claim 1 and 80 to 5% by weight of staple fibers of a thermally stable polymer.

7. The sheet of claim 6 wherein said staple fibers consist of a nitrogen-containing polyheterocyclic compound.

8. The sheet of claim 6 wherein said staple fibers consist of an aromatic polyamide.

9. The sheet of claim 6 wherein said staple fibers consist of an aromatic polyester.

10. Pulp particles consisting essentially of 50 – 90% by weight of mica particles having a particle size such that at least 90% by weight are from 1 to 150 microns, and 50 – 10% by weight of a film-forming polyamide-imide having recurring units which consist essentially of

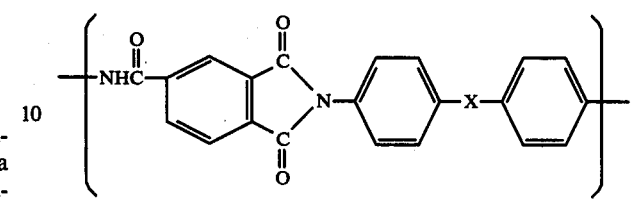

wherein X is —O— or —CH$_2$— in which said polyamide-imide forms a continuous phase and said mica particles are dispersed discontinuously in said continuous phase.

11. The pulp particles according to claim 10 which has a logarithmic viscosity from about 0.5 to about 0.8 measured in N-methyl-2-pyrrolidone.

12. The pulp particles according to claim 10 wherein the content of said mica particles is 60 to 80% by weight.

13. The pulp particles of claim 10 wherein the content of said mica particles is 60 to 70% by weight.

14. A paper-like sheet comprising an integrated intimate mixture of 20 to 95% by weight of the pulp particles of claim 10 and 80 to 5% by weight of staple fibers of a thermally stable polymer.

15. The sheet of claim 14 wherein said stable fibers consist of a nitrogen-containing polyheterocyclic compound.

16. The sheet of claim 14 wherein said staple fibers consist of an aromatic polyamide.

17. The sheet of claim 14 wherein said staple fibers consist of an aromatic polyester.

* * * * *